United States Patent
Oertel et al.

(10) Patent No.: US 11,562,551 B1
(45) Date of Patent: Jan. 24, 2023

(54) IMAGE ANALYSIS FOR DECODING ANGLED OPTICAL PATTERNS

(71) Applicant: Scandit AG, Zürich (CH)

(72) Inventors: Amadeus Oertel, Zürich (CH); Yeara Kozlov, Zürich (CH); Simon Wenner, Zürich (CH)

(73) Assignee: SCANDIT AG, Zürich (CH)

( * ) Notice: Subject to any disclaimer, the term of this patent is extended or adjusted under 35 U.S.C. 154(b) by 0 days.

(21) Appl. No.: 17/855,270

(22) Filed: Jun. 30, 2022

Related U.S. Application Data

(60) Provisional application No. 63/331,069, filed on Apr. 14, 2022.

(51) Int. Cl.
| | |
|---|---|
| G06K 9/00 | (2022.01) |
| G06V 10/24 | (2022.01) |
| G06K 7/10 | (2006.01) |
| G06V 10/762 | (2022.01) |
| G06V 10/25 | (2022.01) |

(52) U.S. Cl.
CPC ....... *G06V 10/245* (2022.01); *G06K 7/10722* (2013.01); *G06V 10/25* (2022.01); *G06V 10/762* (2022.01)

(58) Field of Classification Search
None
See application file for complete search history.

(56) References Cited

U.S. PATENT DOCUMENTS

| | | | | |
|---|---|---|---|---|
| 5,319,181 A * | 6/1994 | Shellhammer | ....... | G06K 7/1093 235/462.11 |
| 5,438,188 A * | 8/1995 | Surka | ................... | G06K 7/1093 235/462.07 |
| 5,889,269 A * | 3/1999 | Bridgelall | .......... | G06K 7/10702 235/462.32 |
| 5,988,505 A * | 11/1999 | Shellhammer | ........... | G06K 7/14 235/472.01 |
| 6,126,074 A * | 10/2000 | He | ....................... | G06K 7/1473 235/494 |
| 6,672,511 B1 * | 1/2004 | Shellhammer | ....... | G06V 10/245 235/462.14 |
| 6,758,399 B1 * | 7/2004 | Brunelli | ............. | G06V 30/1478 382/254 |
| 7,007,846 B2 * | 3/2006 | Shellhammer | ....... | G06V 10/245 235/462.12 |
| 7,270,272 B2 * | 9/2007 | Zhu | .................... | G06K 7/10722 235/462.01 |
| 7,472,831 B2 * | 1/2009 | Schnee | .............. | G06K 7/10861 235/462.11 |
| 7,721,966 B2 * | 5/2010 | Rudeen | .............. | G06K 7/10722 235/462.07 |

(Continued)

OTHER PUBLICATIONS

Gallo et al., "Reading 1D barcodes with mobile phones using deformable templates." IEEE transactions on pattern analysis and machine intelligence 33, No. 9 (2010): 1834-1843. (Year: 2010).*

(Continued)

*Primary Examiner* — Feng Niu
(74) *Attorney, Agent, or Firm* — Kilpatrick Townsend & Stockton LLP

(57) ABSTRACT

An angled optical pattern is decoded. To decode an optical pattern imaged at an angle, an area of interest of an image is received. A start line and an end line of the optical pattern are estimated. Corners of the optical pattern are localized. A homography is calculated based on the corners. And a scanline of the optical pattern is rectified based on the homography.

20 Claims, 13 Drawing Sheets

(56) References Cited

U.S. PATENT DOCUMENTS

| | | | | |
|---|---|---|---|---|
| 7,769,236 | B2* | 8/2010 | Fiala | G06T 7/73 |
| | | | | 382/199 |
| 7,780,084 | B2* | 8/2010 | Zhang | G06K 7/1093 |
| | | | | 235/462.11 |
| 7,878,402 | B2* | 2/2011 | Ye | G06T 3/00 |
| | | | | 235/462.07 |
| 8,181,876 | B2* | 5/2012 | Smith | G06K 7/14 |
| | | | | 382/294 |
| 8,322,620 | B2* | 12/2012 | Ye | G06T 3/00 |
| | | | | 235/462.1 |
| 8,596,540 | B2* | 12/2013 | Adelmann | G06K 7/14 |
| | | | | 235/462.01 |
| 8,881,984 | B2* | 11/2014 | Santos | G06K 7/146 |
| | | | | 235/462.12 |
| 8,881,986 | B1* | 11/2014 | Dhua | G06K 7/1439 |
| | | | | 235/462.25 |
| 9,195,121 | B2* | 11/2015 | Sajadi | H04N 9/3147 |
| 9,224,026 | B2* | 12/2015 | De Almeida Neves | |
| | | | | G06K 7/10722 |
| 9,298,959 | B2* | 3/2016 | Saporetti | G06V 10/147 |
| 9,542,732 | B2* | 1/2017 | Bogan | G06T 3/0075 |
| 9,613,244 | B2* | 4/2017 | Santi | G06K 7/1443 |
| 10,255,891 | B2* | 4/2019 | Haraden | G02B 27/0172 |
| 10,275,863 | B2* | 4/2019 | Bogan | G06T 5/006 |
| 10,565,735 | B2* | 2/2020 | Ghazizadeh | G06T 7/0014 |
| 10,599,902 | B2* | 3/2020 | Bachelder | G06K 7/1452 |
| 10,672,368 | B2* | 6/2020 | Haraden | G02B 27/0172 |
| 10,885,411 | B2* | 1/2021 | Friedman | G06K 19/06131 |
| 2004/0031850 | A1* | 2/2004 | Shellhammer | G06V 10/245 |
| | | | | 235/462.1 |
| 2005/0103868 | A1* | 5/2005 | Zhu | G06K 7/10732 |
| | | | | 235/462.46 |
| 2005/0242186 | A1* | 11/2005 | Ohbuchi | G06K 7/10712 |
| | | | | 235/462.09 |
| 2005/0263599 | A1* | 12/2005 | Zhu | G06K 7/10801 |
| | | | | 235/462.41 |
| 2006/0011725 | A1* | 1/2006 | Schnee | G06K 7/10722 |
| | | | | 235/454 |
| 2006/0081712 | A1* | 4/2006 | Rudeen | G06K 7/14 |
| | | | | 235/462.08 |
| 2007/0098234 | A1* | 5/2007 | Fiala | G06T 7/73 |
| | | | | 382/120 |
| 2007/0257934 | A1* | 11/2007 | Doermann | G06T 3/4007 |
| | | | | 345/606 |
| 2009/0001165 | A1* | 1/2009 | Zhang | G06T 3/608 |
| | | | | 235/462.11 |
| 2009/0090781 | A1* | 4/2009 | Ye | G06T 3/00 |
| | | | | 382/254 |
| 2010/0020970 | A1* | 1/2010 | Liu | G06K 7/1093 |
| | | | | 380/54 |
| 2011/0101101 | A1* | 5/2011 | Ye | G06K 7/14 |
| | | | | 235/462.11 |
| 2011/0155808 | A1* | 6/2011 | Santos | G06K 7/146 |
| | | | | 235/462.15 |
| 2012/0098937 | A1* | 4/2012 | Sajadi | H04N 9/3185 |
| | | | | 348/46 |
| 2012/0173347 | A1* | 7/2012 | De Almeida Neves | |
| | | | | G06K 7/10861 |
| | | | | 705/16 |
| 2014/0367468 | A1* | 12/2014 | Saporetti | G06K 7/10792 |
| | | | | 235/440 |
| 2016/0292831 | A1* | 10/2016 | Bogan | G06T 3/00 |
| 2016/0292832 | A1* | 10/2016 | Bogan | G06T 3/00 |
| 2016/0328591 | A1* | 11/2016 | Santi | G06K 7/10732 |
| 2017/0357884 | A1* | 12/2017 | Friedman | G06K 19/06075 |
| 2018/0158212 | A1* | 6/2018 | Ghazizadeh | A61B 5/445 |
| 2018/0301125 | A1* | 10/2018 | Haraden | G09G 5/006 |
| 2019/0108379 | A1* | 4/2019 | Bachelder | G06K 7/1452 |
| 2019/0189089 | A1* | 6/2019 | Haraden | G06F 12/08 |
| 2019/0244043 | A1* | 8/2019 | Bradley | H04N 19/90 |
| 2019/0251677 | A1* | 8/2019 | Bogan | G06T 3/00 |
| 2020/0380229 | A1* | 12/2020 | Peruch | G06K 7/1443 |
| 2021/0303957 | A1* | 9/2021 | Silva Figueiredo | |
| | | | | G06K 19/06037 |
| 2021/0365654 | A1* | 11/2021 | Uss | G06K 7/1417 |

OTHER PUBLICATIONS

Yang et al., "Automatic barcode recognition method based on adaptive edge detection and a mapping model." Journal of Electronic Imaging 25, No. 5 (2016): 053019. (Year: 2016).*

Şimşekli et al., "A unified probabilistic framework for robust decoding of linear barcodes." In 2015 IEEE International Conference on Acoustics, Speech and Signal Processing (ICASSP), pp. 1946-1950. IEEE, 2015. (Year: 2015).*

Xu, "Geometric, Semantic, and System-Level Scene Understanding for Improved Construction and Operation of the Built Environment." PhD thesis, 2019. (Year: 2019).*

* cited by examiner

IMAGE ANALYSIS FOR DECODING ANGLED OPTICAL PATTERNS

CROSS-REFERENCE TO RELATED APPLICATIONS

This application claims priority to U.S. Provisional Application No. 63/331,069, filed on Apr. 14, 2022, the disclosure of which is incorporated by reference in its entirety for all purposes.

BACKGROUND

This disclosure relates in general to a camera in a mobile device. More specifically, and without limitation, this disclosure relates to decoding barcodes in a scene or image using the camera in the mobile device. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code, and using image analysis to decode the code. An example of a method for using as smartphone to decode a barcode is provided in U.S. Pat. No. 8,596,540, granted on Dec. 3, 2013.

BRIEF SUMMARY

Mobile devices having a camera, and being capable of hosting mobile applications, offer a flexible and scalable solution for optical pattern decoding. However, optical patterns at angles can be challenging to decode. In some embodiments, systems and/or techniques are used to improve decoding capabilities of optical patterns, such as barcodes, that are imaged at an angle.

In some embodiments, an apparatus for decoding an optical pattern comprises a camera and one or more processors. The one or more processors are configured to receive an initial area of interest of an image predicted to contain the optical pattern; estimate a start line and an end line of the optical pattern; localize corners of the optical pattern; calculate a homography between localized corners of the optical pattern and a specified shape; rectify a scanline to generate a rectified scanline, based on the homography between the localized corners of the optical pattern and the specified shape; and/or decode the optical pattern along the rectified scanline. In some embodiments, estimating the start line and the end line comprises generating a plurality of scanlines across the optical pattern, within the area of interest (scanlines can span or extend outside the area of interest), wherein the plurality of scanlines comprise data associated with the optical pattern; computing edge responses of the optical pattern using the plurality of scanlines; clustering the edge responses into a plurality of lines; and/or selecting a first line of the plurality of lines as the start line and a second line of the plurality of lines as the end line.

In some embodiments, a method for decoding an optical pattern comprises receiving an initial area of interest of an image predicted to contain the optical pattern; estimating a start line and an end line of the optical pattern; localizing corners of the optical pattern; calculating a homography between localized corners of the optical pattern and a specified shape; rectifying a scanline to generate a rectified scanline, based on the homography between the localized corners of the optical pattern and the specified shape; and/or decoding the optical pattern along the rectified scanline. In some embodiments estimating the start line and the end line comprises generating a plurality of scanlines across the optical pattern, wherein the plurality of scanlines comprise data associated with the optical pattern; computing edge responses of the optical pattern using the plurality of scanlines; clustering the edge responses into a plurality of lines; and/or selecting a first line of the plurality of lines as the start line and a second line of the plurality of lines as the end line.

In some embodiments, a method for decoding a damaged or obscured optical pattern includes receiving an image; projecting multiple scanlines on the image; ascertaining one or more useable segments of the multiple scanlines, based on an image quality of one or more regions of the image, wherein a quality of a single scanline is insufficient to decode the optical pattern; selecting usable segments from each of the multiple scanlines to decode the optical pattern; and/or decode the optical pattern using the segments from multiple scanlines.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
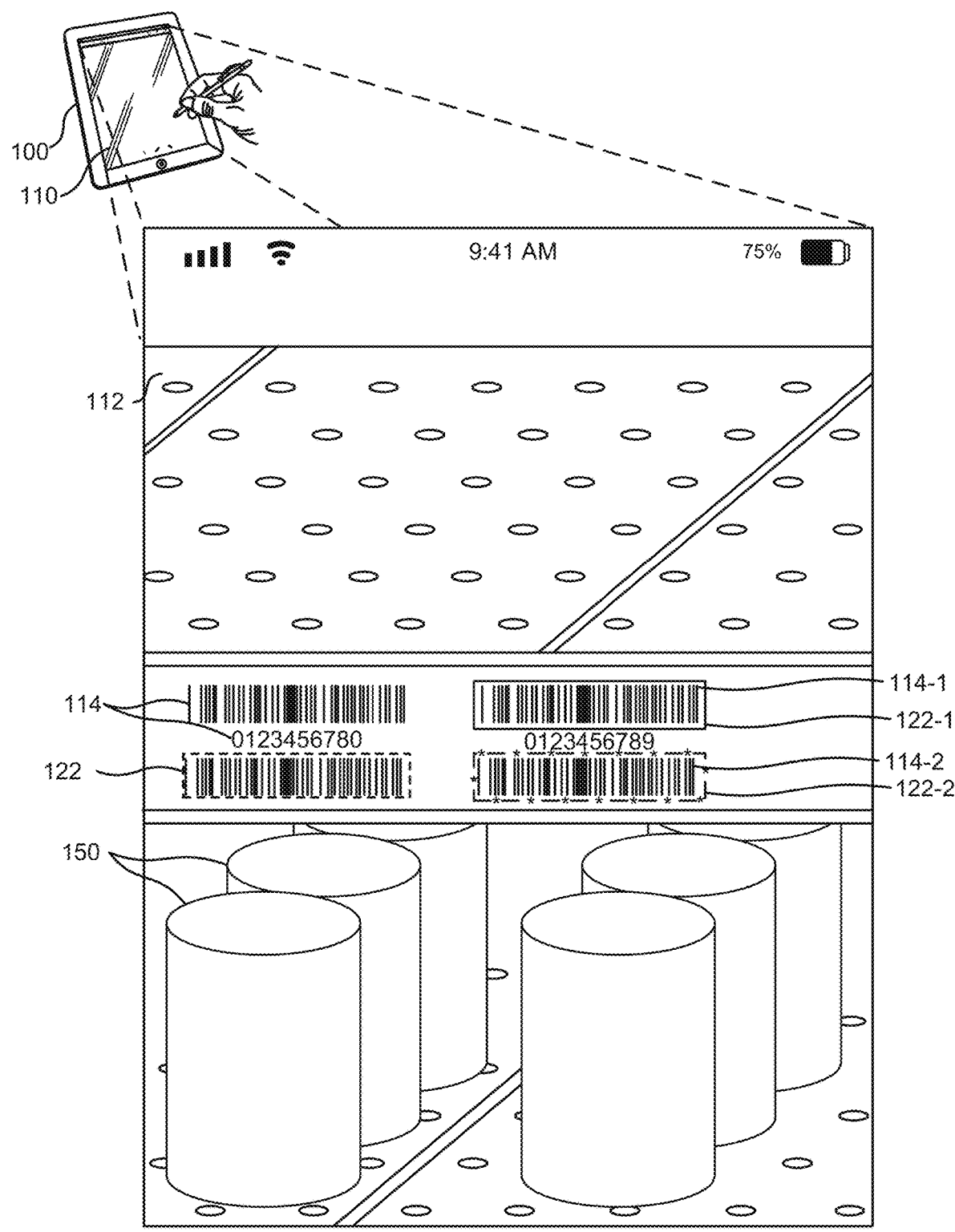
FIG. 1 depicts an example technique for automated recognition and decoding of a pattern in an image containing multiple patterns, in accordance with some embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Optical patterns have widely proliferated commerce. As such, the importance of quickly and accurately decoding optical patterns is clear. Distortion of optical patterns may complicate the process of decoding an optical pattern. For example, if an image of an optical pattern is not parallel to the plane of the camera, the optical pattern may be difficult or impossible to read accurately. If the image is pitched away from the camera, the width of lines and spaces included in the optical pattern may be narrower at the top of the optical pattern than at the bottom of the optical pattern. Similarly, if the image is rotated such that one side of the image is further away from the camera than the opposite side, the width of lines and spaces may be narrower as they approach the far side. In both cases, false readings of the optical pattern may be obtained, or a complete failure to decode the optical pattern may be experienced. Systems and methods disclosed herein may enable distorted optical patterns to be accurately decoded, increasing efficiency and improving accuracy.

Examples of optical patterns include 1D barcodes, some 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as barcodes and QR codes, are used in many areas (e.g., shipping, retail, warehousing, travel), there exists a need for quicker scanning of optical patterns. In some embodiments, optical patterns can include alpha and/or numerical characters. The following techniques can be used individually, in combination with each other, and/or in combination with other techniques to increase the speed, accuracy, and/or efficiency of scanning for optical patterns.

FIG. 1 depicts an example technique for automated detection and decoding of one or more optical patterns in an image, in accordance with some embodiments. In FIG. 1, a system 100 (e.g., a mobile device) comprises a display 110 and a camera. The camera has a field of view (FOV) of a real scene. The camera is configured to capture an image 112 of the real scene. The real scene contains one or more optical patterns 114.

The camera can capture a plurality of images. The plurality of images can be presented in "real time" on the display 110 (e.g., presented on the display 110 in a sequential manner following capture, albeit potentially with some latency introduced by system processes). The image 112 is one of the plurality of images. The plurality of images depict the real world scene as viewed through the field of view of the camera. The real world scene may include multiple objects 150, patterns, or other elements (e.g., faces, images, colors, etc.) of which the optical patterns 114 are only a part. FIG. 1 depicts a first optical pattern 114-1 and a second optical pattern 114-2, among other optical patterns 114.

The image 112 may be captured by the camera and/or provided via additional or alternative system processes (e.g., from a memory device, a communications connection to an online content network, etc.). The optical patterns 114 are detected and/or recognized in the image 112. Detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type), specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, an approach can be used to detect a pattern of characters, and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that a user is presented the positions of the optical patterns 114 as well as other metadata, including but not limited to: pattern category, decoding status, or information encoded by the optical patterns 114.

The system 100 may identify one or more of the optical patterns 114 for decoding. As mentioned above, the decoding may be automated, initializing upon detection of an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about an optical pattern template category or the number of patterns detected. Following decoding, the first graphical element 122-1 may present information specific to the first optical pattern 114-1. For an optical pattern 114 that is detected, but decoding is unsuccessful, the system 100 may alter a graphical element 122 to indicate decoding failure, as well as other information indicative of a source of the error. As an illustrative example, a second graphical element 122-2 may indicate that the second optical pattern 114-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded, or is changed to a green box if the second optical pattern 114-2 is decoded. Examples of graphical elements used during detecting and decoding optical patterns can be found in U.S. application Ser. No. 16/905,722, filed on Jun. 18, 2020, which is incorporated by reference for all purposes. Optical patterns can also be tracked, as described in U.S. patent application Ser. No. 16/920,061, filed on Jul. 2, 2020, which is incorporated by reference for all purposes.

Figure 2:
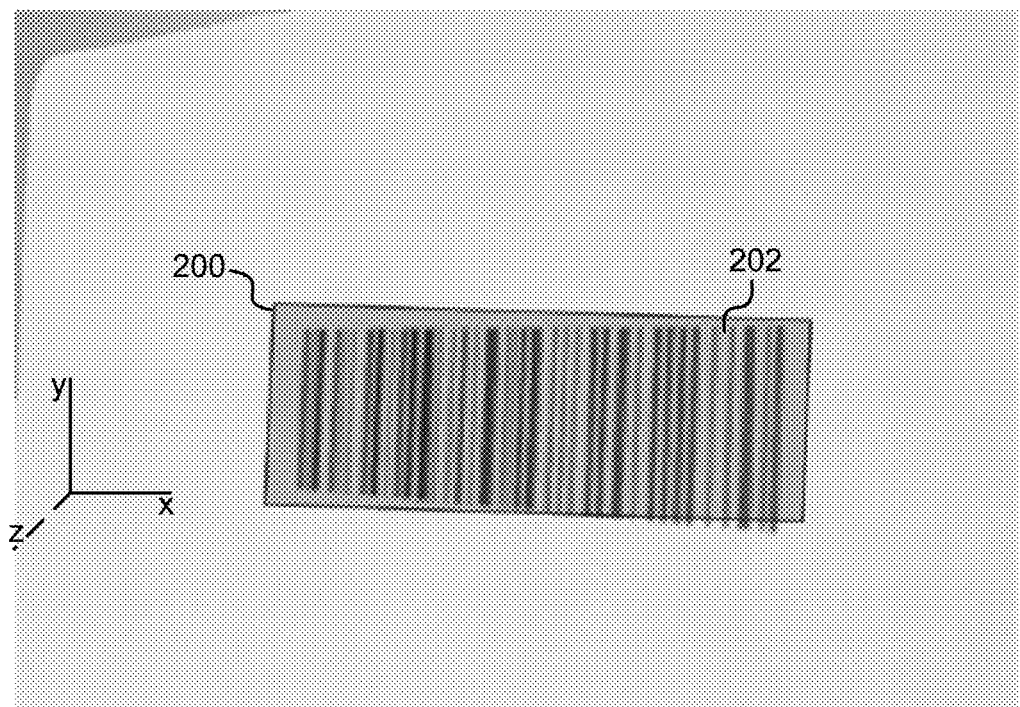
FIG. 2 depicts an area of interest including an optical pattern, in accordance with some embodiments.

FIG. 2 depicts an area of interest 200 including an optical pattern 202, in accordance with some embodiments. The area of interest 200 is included in an image acquired by a camera (e.g., by a camera that is part of system 100 in FIG. 1, or other device having a camera such as a mobile device). The image may be acquired by the camera automatically, or manually (e.g., in response to user input). The area of interest is an area in an image likely to contain an optical pattern. In some embodiments, the area of interest 200 is selected by a user. In some embodiments, the area of interest 200 is determined by optical recognition software, a machine-learning model, and/or other suitable automated system.

The area of interest 200 includes the optical pattern 202. The optical pattern 202 may be a 1D barcode, a 2D barcode (e.g., a PDF417 barcode), and/or include numbers, letters, and symbols. The optical pattern may include information about a product or about the object on which it is included. The information may be encoded to provide for fast access and/or machine readable information (e.g., a UPC code). Although the area of interest 200 is shown as mostly including the optical pattern 202, other possibilities are considered, such as including the entire optical pattern 202.

For example, the area of interest 200 may be printed on surface, such as a box, a label, a container, etc. The surface may include other drawings, figures, markings, etc., including the optical pattern 202. The area of interest 200 may therefore include more markings than just the optical pattern 202, which may create uncertainty on what the optical pattern 202 is.

Further, the optical pattern 202 may be out of focus (e.g., "blurry"), rotated, and/or tilted with respect to the image plane of the camera, such that the optical pattern 202 may not be immediately recognizable as an optical pattern to be decoded. For example, the optical pattern 202 appears to be blurry, rotated about the y-axis (yaw), and rotated about the z-axis (roll). The systems and methods described below may address some or all of these issues, as well as rotation about the x-axis (pitch). Subsequent figures depicting optical patterns may be of the same optical pattern as the optical pattern 202 or may be different optical patterns used to illustrate certain embodiments.

Figure 3:
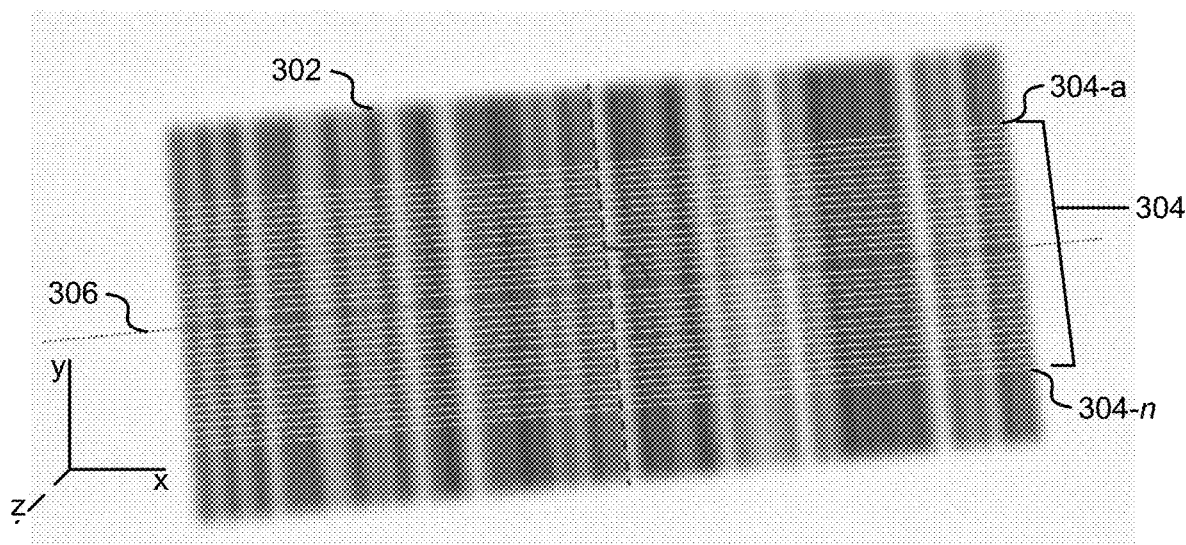
FIG. 3 depicts a plurality of scanlines generated across an optical pattern, in accordance with some embodiments.

FIG. 3 depicts an embodiment of a plurality of scanlines generated across an optical pattern 302. The optical pattern 302 may be included in an image including an area of interest such as the area of interest 200 in FIG. 2. The optical pattern 302 may be similar to the optical pattern 202 in FIG. 2 or may be a different optical pattern. Further, the optical pattern 302 may be rotated in different directions as compared to the optical pattern 202. In this case, the optical pattern 302 has a roll rotation (e.g., rotation about the y axis) and is blurry.

A plurality of scanlines 304 from scanline 304-a to scanline 304-n is generated perpendicular to a predicted direction of the optical pattern 302. The predicted direction may be determined by optical recognition software, a machine learning model, or other automated system. For example, many barcodes are rectangular, and thus scanlines are oriented parallel to a major axis of the rectangle. In another example, a gradient vector may be computed for pixels within a given area. The gradient vector that most frequently occurs may be selected as the predicted direction or orthogonal to the predicted direction.

In some embodiments, the plurality of scanlines 304 may be generated such that the plurality of scanlines 304 do not overlap. The plurality of scanlines 304a-n may include a primary scanline 306. The primary scanline 306 can be determined as scanline 304 predicted to have the least distortion of the plurality of scanlines 304, or the primary scanline 306 can be a center scanline of the plurality of scanlines 304. Although the primary scanline 306 is shown as being in the center of the plurality of scanlines 304, the primary scanline may not be in the center (e.g., on a portion of the optical pattern predicted to be a minimum of distortion). In some embodiments, the scanlines may be drawn to overlap (e.g., because initial scanlines at different angles that overlap may be beneficial in some cases).

The plurality of scanlines 304 may be decoded to obtain data associated with the optical pattern. The data may include information about a product or about an object on which the optical pattern 302 is included. The data may be encoded to provide for fast access to the information (e.g., a UPC code).

Figure 4:
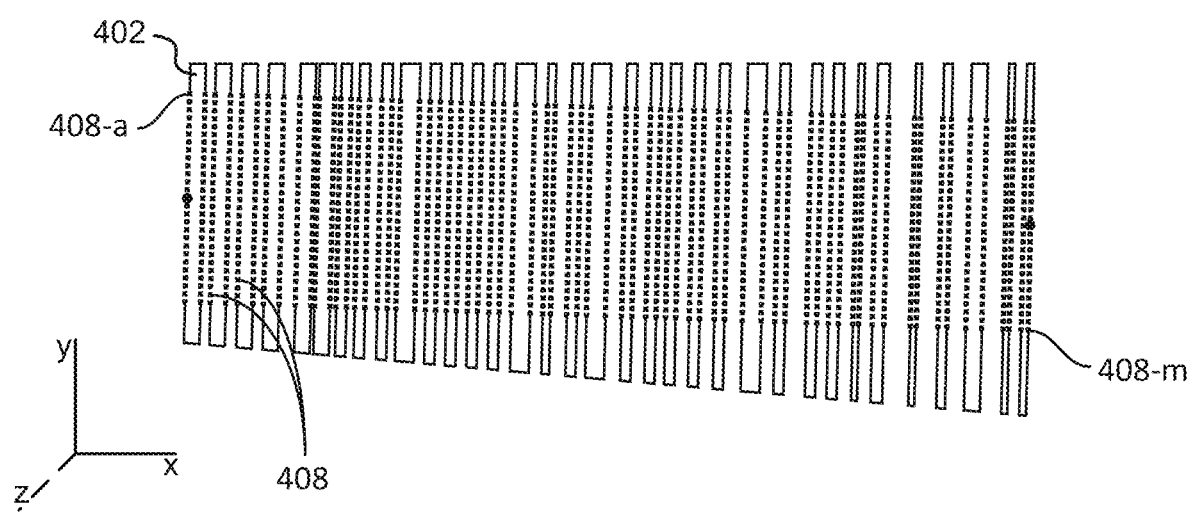
FIG. 4 depicts a plurality of edge responses on an optical pattern, in accordance with some embodiments.

FIG. 4 depicts a plurality of edge responses 408-a to 408-m on an optical pattern 402, in accordance with some embodiments. The optical pattern 402 may be the same as optical pattern 302 in FIG. 3. The plurality of edge responses 408 may be calculated along one or more of a plurality of scanlines, such as the plurality of scanlines 304 in FIG. 3.

The plurality of edge responses 408 may correspond to a change in pixel intensity as compared to an adjacent pixel. For an example, a first pixel may register as black. A second pixel, adjacent to the first pixel may register as white. Thus, the system may then determine that an edge exists at the point where the first pixel and the second pixel meet and compute an edge response. A third pixel, also adjacent to the first pixel, may register as black. The system may therefore determine that there is no edge between the first and third pixels, and thus not compute an edge response. In some embodiments, edge responses are split into two sets: rising transitions and falling transitions (e.g., depending on whether the intensity increases or decreases with respect to the scanline direction/predicted primary axis of the optical pattern). For example, edge response 408-a is a falling edge response, and edge response 408-m is a rising edge response. Identifying rising and falling edge responses when fusing edge responses across multiple scanlines can help by reducing the risk of fusing edge responses that are close to each other but belong to different ground truth edges of the optical pattern. This can be especially helpful when the resolution of the region of interest covering the optical pattern in the image is small.

Further, there may be a predetermined threshold for the pixel intensity, where below the threshold a pixel is deemed white, and above which (or above a second threshold) a pixel is determined to be black. In some embodiments, a predetermined threshold may be set for an intensity difference between two or more pixels, such that if the intensity difference between the pixels is above the predetermined threshold, an edge response may be computed.

The plurality of edge responses 408 may also include edge responses not corresponding to the optical pattern 402. These edge responses may be false positives. Therefore, a statistical analysis (or a "statistical model") of the optical pattern may be performed (e.g., using a background and a foreground). The statistical analysis may include ascertaining relative intensities of pixels in an area of interest such as the area of interest 200 in FIG. 2. The statistical analysis may reduce a number of false positives by adjusting the predetermined threshold based, at least in part, on the image of the area of interest. The statistical analysis may then be used to determine edge responses along a plurality of scanlines, such as along the plurality of scanlines 304 in FIG. 3. Because false positives may be reduced, there may be more defined "quiet zones," where there are significantly less edge responses computed. The quiet zones may be used to locate or refine the location of the optical pattern within the area of interest. Quiet zones may be part of an ISO standard.

Figure 5:
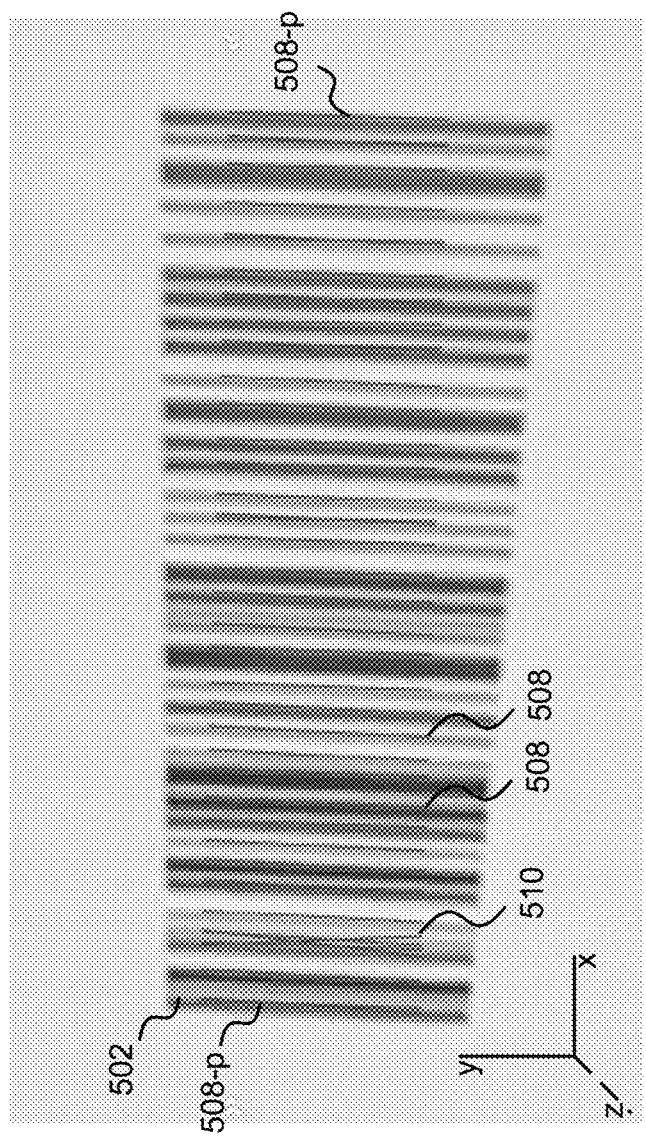
FIG. 5 depicts a plurality of lines determined from a plurality of edge responses, in accordance with some embodiments.

FIG. 5 depicts a plurality of lines 508-$a$ to 508-$p$ on an optical pattern 502 determined from a plurality of edge responses, in accordance with some embodiments. The optical pattern 502 may be the optical pattern 402 from FIG. 4, and have the same properties and/or distortions. Thus, a plurality of edge responses such as the plurality of edge responses 408 in FIG. 4 may have been calculated for the optical pattern 502.

The plurality of lines 508 may be generated by clustering the plurality of edge responses. A direction of the plurality of lines may be determined by using a predicted direction of the optical pattern, as is used by the plurality of scanlines 304 described in FIG. 3. The plurality of lines 508 may therefore be generated to be perpendicular to the plurality of scanlines.

In some embodiments, the plurality of lines 508 may be generated using a best fit line through the plurality of edge responses. For example, geometric expectations may be used to determine a direction of one or more of the plurality of lines 508 (e.g., an optical pattern may be expected to be rectangular and wider than tall, thus an expected direction of the plurality of lines 508 may be ascertained). However, the plurality of edge responses may lead to misaligned lines 510 within the plurality of lines 508 due to blurriness of the image of the area of interest or some other reason. To address this, a common vanishing point may be determined for the plurality of lines 508 (e.g., as is discussed below in relation to FIG. 6). Thus, a misaligned line 510 can be discarded and/or recalculated to be a best-fit line through a plurality of edge responses, such that a recalculated line conforms to the common vanishing point.

The plurality of lines 508 may be calculated in only a region of interest with a high density of edge responses. In some embodiments, edge responses may be clustered into lines in regions only where the density of edge responses is above a certain threshold. Thus, no lines may be calculated in quiet zones, and a start line and an end line associated with the optical pattern may be estimated. For example, a first line 508-$a$ and a last line 508-$p$ of the plurality of lines 508 border a quiet zone, and therefore are estimated to be the start line (e.g., line 508-$a$) and the end line (e.g., line 508-$p$).

In some embodiments, several candidate lines of the plurality of lines 508 may be candidates to be the start line and/or the end line. The candidate lines may be determined by a Hough transform or other method. The candidate lines may be applied to a machine-learning or other model to filter outliers.

Figure 6:
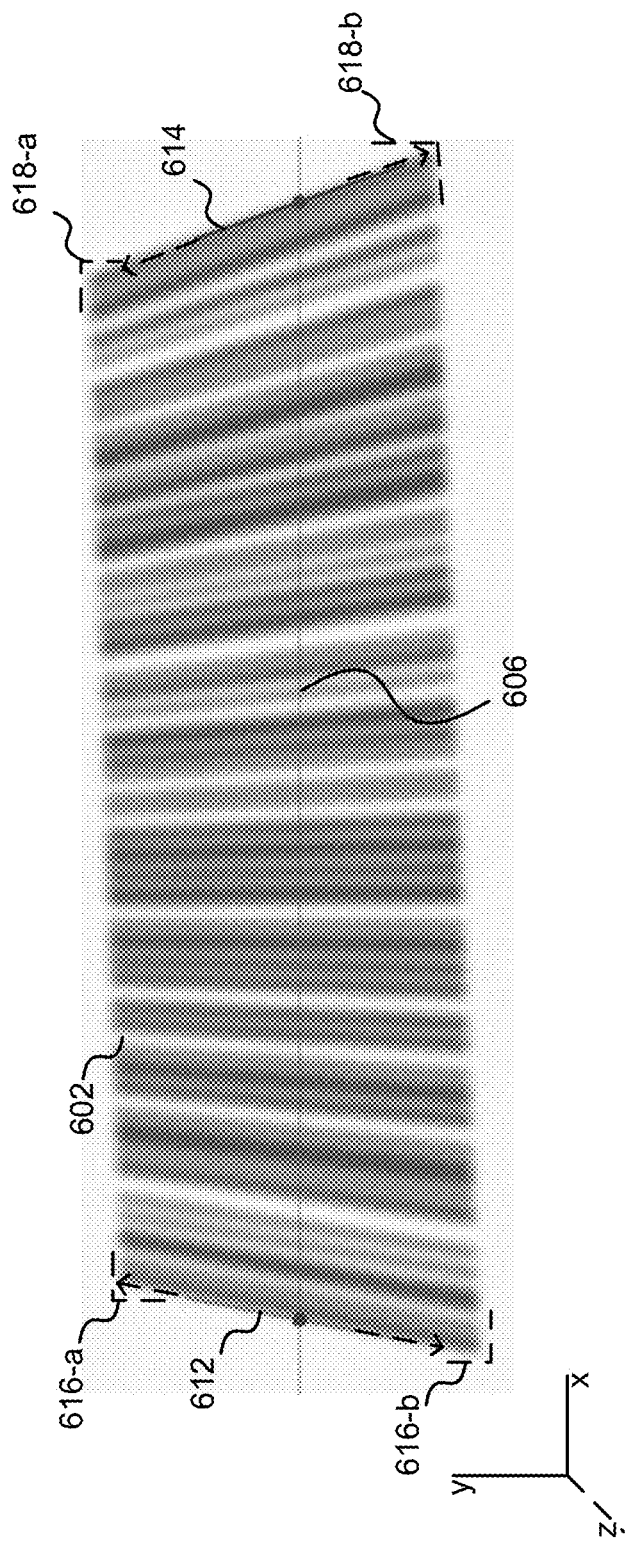
FIG. 6 depicts localizing the corners of an optical pattern with pitch distortion, in accordance with some embodiments.

FIG. 6 depicts localizing corners of an optical pattern 602 with pitch distortion, in accordance with some embodiments. The optical pattern 602 may be similar to the optical pattern 502 in FIG. 5, and thus a plurality of lines such as the plurality of lines 508 in FIG. 5 may have been calculated. A primary scanline 606 may be similar to the primary scanline 306 in FIG. 3, and/or the primary scanline 606 may correspond to a scanline estimated to have a minimum of distortion.

The primary scanline 606 may be used, at least in part, to select a start line 612 and an end line 614. The start line 612 may be characterized by being the first line in the plurality of lines after a quiet zone (e.g., as is described in relation to FIG. 5). Similarly, the end line 614 may be determined to be the last line in the plurality of lines before a quiet zone. Thus, the lines between the start lines 612 and the end line 614 may be determined to be included in the optical pattern.

The start line 612 and the end line 614 may be used to calculate a common vanishing point. In some embodiments, the start line 612 and the end line 614 were selected based on compliance with a common vanishing point. The common vanishing point may be one of several vanishing point types. A vanishing point type may be associated with the rotation of the image of the area of interest (and thus the optical pattern 602) around the x-axis away from a camera as shown in FIG. 6. Because the image is rotated away from the camera, the start line 612 and the end line 614 may include a common vanishing point some distance into the image (or into the page in FIG. 6). A common vanishing point into the image may indicate the optical pattern 602 includes pitch distortion. In some embodiments, the image may be rotated about the x-axis towards the camera. In that case, the start line 612 and the end line 614 may include a common vanishing point away from the image (or out of the page in FIG. 6). A common vanishing point away from the image may also indicate pitch distortion. In some embodiments, the start line 612 and the end line 614 may be parallel. In that case, there would be no common vanishing point.

The common vanishing point may be used to confirm a direction for the plurality of lines calculated by the clustering of edge responses. Thus, misaligned lines such as the misaligned lines 510 in FIG. 5 may be corrected by recalculating the misaligned lines to conform to the common vanishing point. Furthermore, the common vanishing point may be used to determine whether or not pitch distortion exists and calculate accordingly.

The start line 612 and the end line 614 may then be iteratively grown to localize the start corners 616-$a$ and 616-$b$ and the end corners 618-$a$ and 618-$b$. The start line 612 may be extended towards and away from the common vanishing point until another quiet zone is encountered. The other quiet zone may correspond to an edge of the optical pattern. The start corners 616 may then be calculated. A similar process may be performed on the end line 614 to calculate the end corners 618. Thus, the border dimensions of the optical pattern 602 may be calculated, along with angles associated with image distortion.

The dimensions of the optical pattern 602 and/or distortion may be used to compute a homography between the optical pattern 602 and a specified shape. In some embodiments, the specified shape may be rectangular. The homography may be associated with a rectified image or shape of the optical pattern 602, such that distortion is corrected (e.g., pitch, yaw, or roll distortion). For example, the optical pattern 602 could be an EAN-13 barcode and the specified shape would be a rectangle with dimensions of an EAN-13 barcode. Border dimensions and angles associated with image distortion may be used to map the optical pattern 602 to an associated optical pattern, parallel to a plane of the camera (or "flat"). Thus, the width of the plurality of lines included in the optical pattern, and/or the spaces between each of the plurality of lines, may be normalized and properly decoded.

In some embodiments, a segment (e.g., a line segment) is grown looking at pixel intensity (e.g., using a model that has some tolerance for differences and/or only looking at pixel intensity). For example, a line tracing algorithm computes a search direction based on the edge direction, and traverses pixels in that direction. Pixels are added to the edge if the intensity value is close to the average pixel intensity of the pixels which were identified as belonging to the edge. The algorithm is configured to adapt to local variation due to illumination changes and other disturbances.

In some embodiments, a segment is grown by looking at a pixel intensity and comparing the pixel intensity to the intensity of surrounding and/or nearby pixels. For example, the segment is grown as described in the preceding paragraph with an additional stipulation that pixel values/intensities be different enough from neighboring pixels (e.g., pixels to the sides, and/or pixels perpendicular to a search direction).

In some embodiments, a machine learning model is used. For example, a semantic segmentation model that classifies pixels as belonging to a barcode and non-barcode pixels is used to create a segmentation map. An edge model can be fit based on values of the segmentation map.

Figure 7:
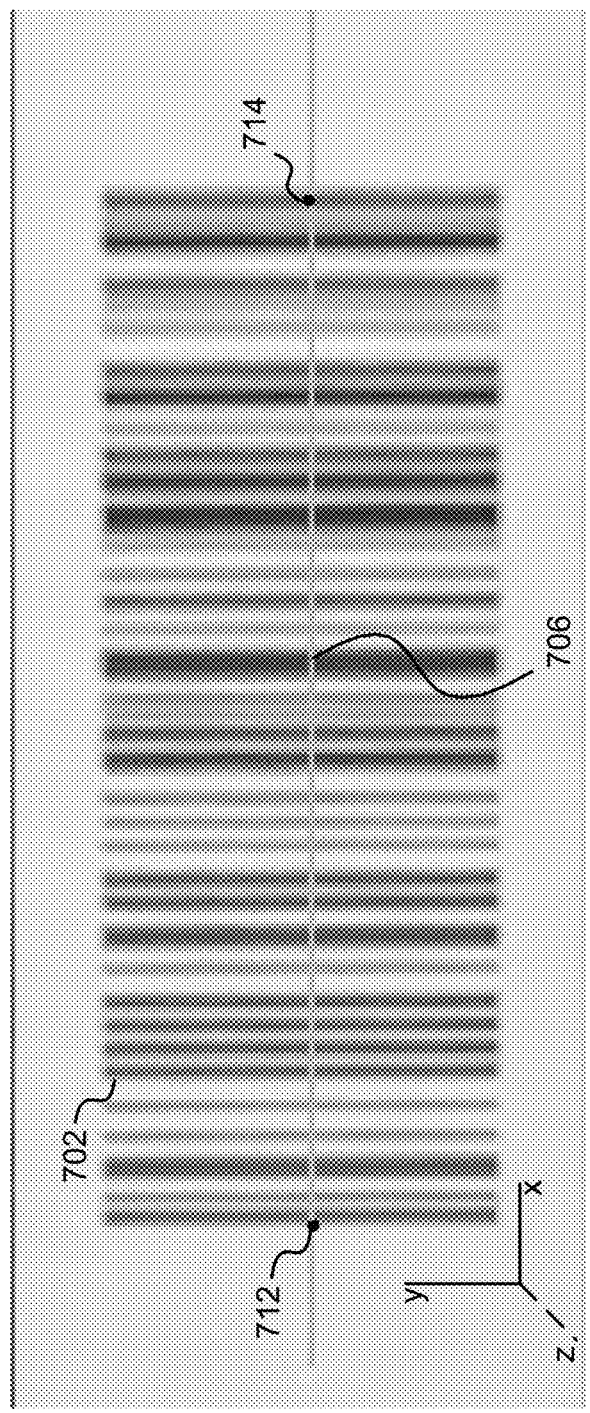
FIG. 7 depicts a rectified scanline of an optical pattern, in accordance with some embodiments.

FIG. 7 depicts a rectified scanline 706 of an optical pattern 702, in accordance with some embodiments. The optical pattern 702 may be the result of a homography calculated on a distorted optical pattern such as the optical pattern 602 in FIG. 6. The rectified scanline 706 may be similar to the primary scanline 306 in FIG. 3, transformed by the same parameters used to calculate the homography that resulted in the optical pattern 702. In some embodiments a new scanline may be sampled from the optical pattern 702.

The rectified scanline 706 may include a start point 712 and an end point 714. The start point 712 may correspond to a start line such as the start line 612 in FIG. 6. Similarly, the end point 714 may correspond to an end line such as the end line 614 in FIG. 6. The rectified scanline 706 may also include a plurality of points corresponding to a plurality of lines included in the optical pattern 702. Using the start point 712, the end point 714, and/or the plurality of points between, the optical pattern may be decoded and data associated with the optical pattern accessed. The data may include information about a product or about the object on which the optical pattern 702 is included.

Figure 8:
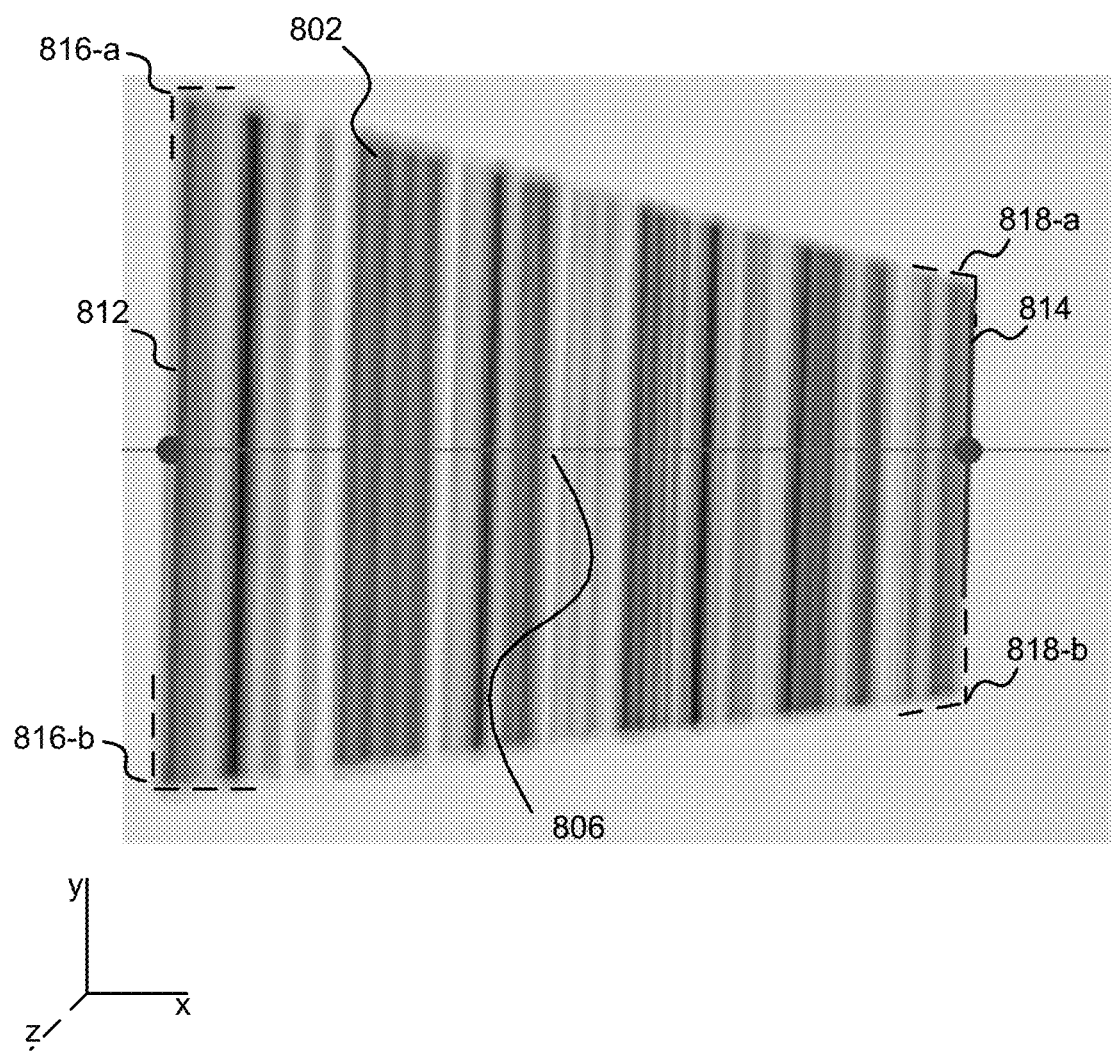
FIG. 8 depicts an optical pattern with yaw distortion, in accordance with some embodiments.

FIG. 8 depicts an optical pattern 802 with yaw distortion, in accordance with some embodiments. The optical pattern 802 may be rotated about the y-axis (yaw distortion) and include a start line 812 and an end line 814. The optical pattern 802 may also include a primary scanline 806, similar to the primary scanline 206 in FIG. 3.

Unlike the optical pattern 602 in FIG. 6, the optical pattern 802 may not have pitch distortion. Thus, the start line 812 and the end line 814 may be parallel. However, because of the yaw distortion, the distance between the start corners 816-*a* and 816-*b* may be different than the end corners 818-*a* and 818-*b*. A machine-learning model or other program may then determine that the optical pattern 802 includes yaw distortion, based at least in part on the difference in the distance between the start corners compared to the distance between the end corners 818.

The yaw distortion may cause a width associated with each of the lines and spaces included in the optical pattern 802 to appear narrower than in reality. For example, in FIG. 6, the lines and spaces nearer the end line 814 may appear narrower relative to their realistic width than the lines and spaces nearer the start line 812. By rectifying the primary scanline 806 (e.g., using a homography to resample the primary scanline from the image in a non-uniform manner) and/or the optical pattern 802, the optical pattern 802 can be decoded.

Although FIG. 8 shows an optical pattern 802 with yaw distortion and no pitch distortion other examples are considered. For example, an optical pattern may have both pitch distortion (such as the optical pattern 602 in FIG. 6) and yaw distortion (such as the optical pattern 802). The start corners and end corners may be computed using a common vanishing point. The difference in the distances between the start corners and the end corners may also be calculated. Both results may then be used to calculate a homography and rectify the scanline of the optical image.

Figure 9:
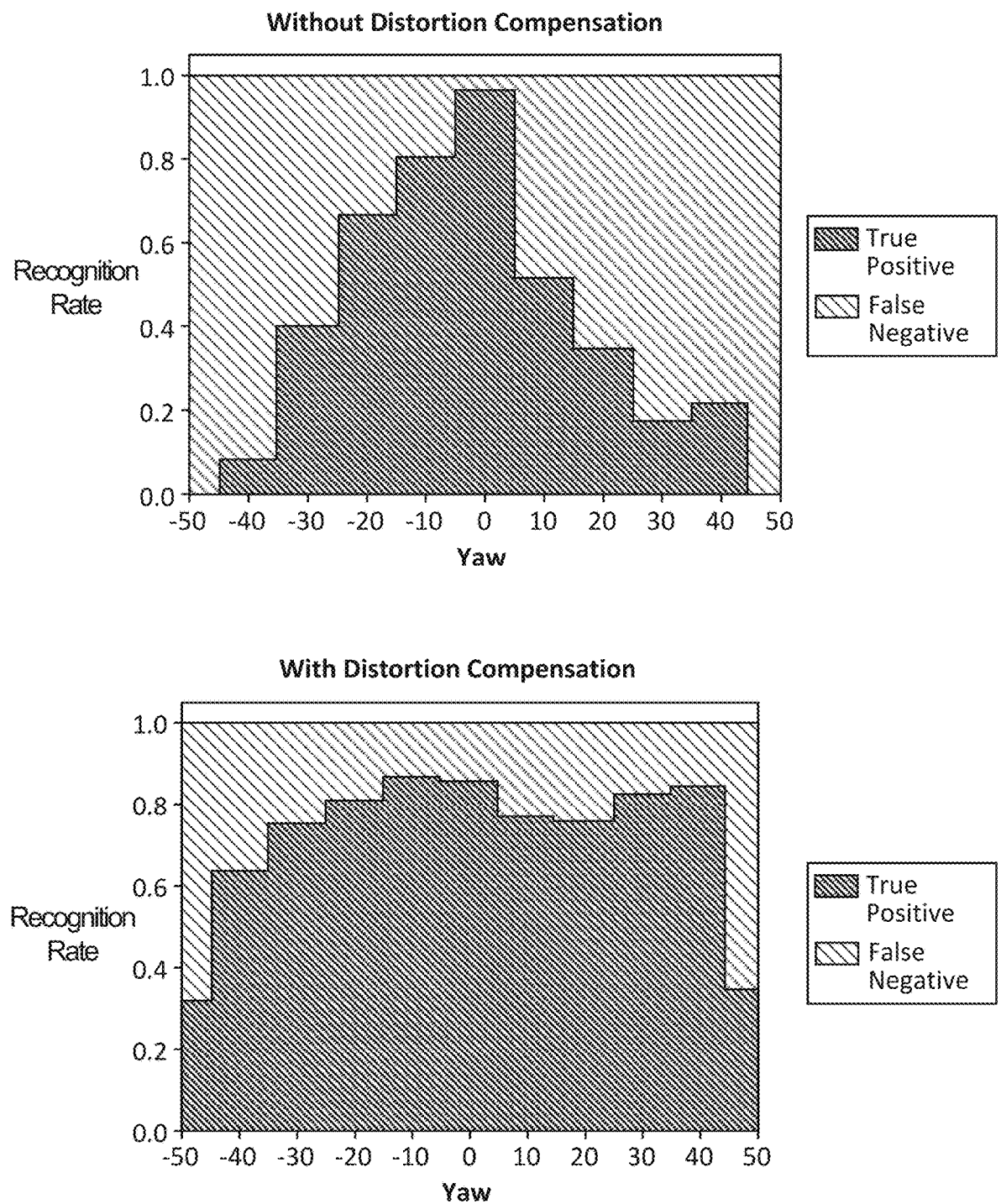
FIG. 9 depicts a graph of success rates of decoding an optical pattern in accordance with some embodiments.

FIG. 9 depicts a graph of success rates of decoding an optical pattern in accordance with some embodiments. In FIG. 9, success rate versus yaw (in degrees) is shown. Current performance shows much higher success rates for greater angles of yaw than the baseline performance. For example, the baseline performance graph shows a recognition rate of 0.0 with a yaw distortion (D) beyond −50° and beyond 45°. The current performance graph shows a recognition rate of approximately 0.3 for D equal to −50° and 45°. Improved recognition rates are achieved for −45°<D<−10° and for 10°<D<40°. The graphs in FIG. 9 were measured on a test set with nearly 300 images distributed almost equally between yaw angles.

The improved recognition rates at higher angles may enable a device to decode more optical patterns more efficiently, as the device does not need to be as flat to the optical pattern as current technology requires. Furthermore, although the baseline performance graph and the current performance graph show a range of −50° to 50°, even more extreme angles may also be enabled. For example, an optical pattern with a yaw distortion of 70° may be decoded with a 0.25 recognition rate.

Figure 10:
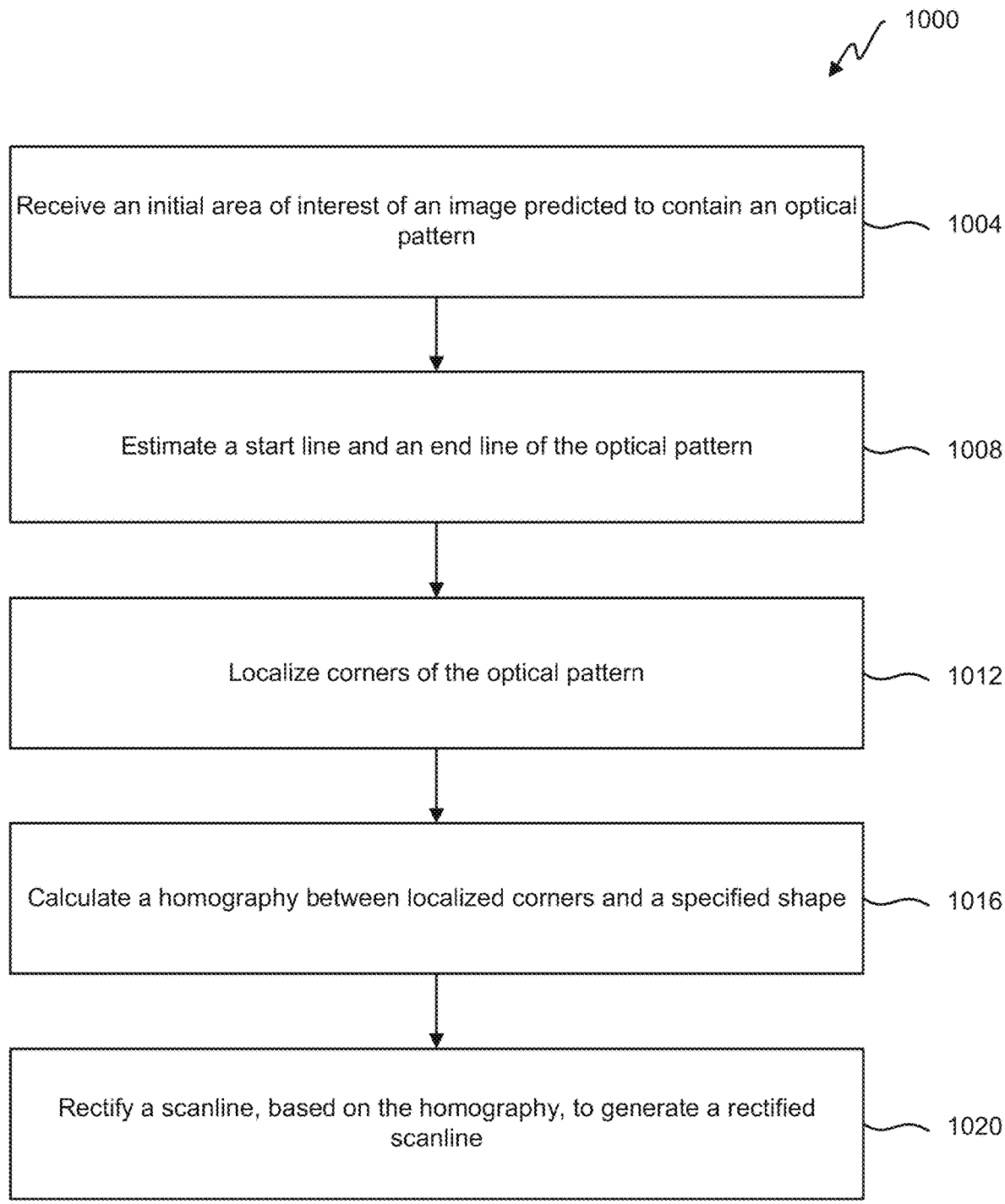
FIG. 10 depicts a flowchart of an embodiment of a process for decoding blurry optical patterns, in accordance with some embodiments.

Referring next to FIG. 10, a flowchart of an embodiment of a process 1000 for decoding a distorted optical pattern is shown. At step 1004, an initial area of interest of an image is received. The initial area of interest is predicted to include the distorted optical pattern. The initial area of interest may be similar to the area of interest 200 in FIG. 2. In some embodiments, the initial area of interest is equal to or less than half or a quarter of the area of the image. In some embodiments, the initial area of interest may be the entire image (e.g., if a barcode fills up the entire image). The initial area of interest may be a user defined area, may be identified by a machine-learning model, and/or may be identified using a computer-vision model.

At step 1008, a start line and an end line of the optical pattern are estimated for the distorted optical pattern. Estimating the start line and the end line may include several steps. In some embodiments, a plurality of scanlines are generated across a predicted direction of the distorted optical pattern. The plurality of scanlines may include data associated with the optical pattern. The data may include information about a product or about the object on which the optical pattern is included. The information may be encoded to provide for fast access to the information (e.g., a UPC code).

The plurality of scanlines may be perpendicular to the predicted direction of the optical pattern, as is described in FIG. 3. For example, the plurality of scanlines in a direction that is predicted to be perpendicular to directions of lines of a barcode. The predicted direction may be determined by optical recognition software, a machine learning model, or other automated system. The plurality of scanlines may be generated such that the plurality of scanlines do not overlap (e.g., scanlines are parallel). The plurality of scanlines may include a primary scanline, where the primary scanline is predicted as being the least distorted of the plurality of scanlines, or the primary scanline is a center scanline. The primary scanline may be where on the optical pattern is determined to be of low or a minimum of distortion.

In some embodiments, multiple scanlines may be generated on the optical pattern, where a single scanline is unusable to decode the entire optical pattern, whether due to distortion, damage, or other reason. One or more portions of each scanline may then be ascertained to be usable based on an image quality of one or more regions of the image. The useable portions may be selected from each of the multiple scanlines in order to decode the optical pattern. Thus, a damaged optical pattern may be reconstructed by using portions of multiple scanlines.

Estimating the start line and the end line may include computing a plurality of edge responses of the distorted optical pattern. The edge responses may be generated along each of the plurality of scanlines. The plurality of edge responses may correspond to a change in pixel intensity as compared to an adjacent pixel. For an example, a first pixel may register as black. A second pixel, adjacent to the first pixel, may register as white. Thus, the system may then determine that an edge exists at the point where the first pixel and the second pixel meet and compute an edge response. A third pixel, also adjacent to the first pixel, may register as black. The system may therefore determine that there is no edge between the first and third pixels, and thus not compute an edge response.

Further, there may be a predetermined threshold for the pixel intensity, where below the threshold a pixel is deemed white, and above which a pixel is determined to be black. In some embodiments, a predetermined threshold may be set for an intensity difference between two or more pixels, such that if the intensity difference between the pixels is above the predetermined threshold, an edge response may be computed.

Estimating the start line and the end line may include clustering the edge responses into a plurality of lines. A direction of the plurality of lines may be determined by using a predicted direction of the optical pattern, as is used by the plurality of scanlines 304 described in FIG. 3. The plurality of lines may therefore be generated to be perpendicular (e.g., nearly perpendicular; plus or minus 5, 10, 15, or 20 degrees) to the plurality of scanlines.

In some embodiments, the plurality of lines may be generated using a best fit line through the plurality of edge responses. For example, geometric expectations may be used to determine a direction of one or more of the plurality of lines (e.g., an optical pattern may be expected to be rectangular and wider than tall, thus an expected direction of the plurality of lines may be determined). However, the plurality of edge responses may lead to misaligned lines within the plurality of lines due to blurriness of the image of the area of interest or other reason. To address this, a common vanishing point may be determined for the plurality of lines. Thus, the misaligned lines may be re-calculated to be a best-fit line through a plurality of edge responses, such that the recalculated lines conform to the common vanishing point.

In some embodiment, the plurality of lines may be calculated only in a region of the initial area of interest with a high density of edge responses. In some embodiments, edge responses may be clustered into lines in regions only where the density of edge responses are above a certain threshold. Thus, no lines may be calculated in quiet zones, and a start line and an end line associated with the optical pattern may be estimated. For example, the first and last lines of the plurality of lines may be bordered by a quiet zone, and therefore be determined to be the start and end lines.

In some embodiments, several candidate lines of the plurality of lines may be candidates to be the start line and/or the end line. The candidate lines may be determined by a Hough transform or other suitable method. The candidate lines may then be applied to a machine-learning and/or statistical model to filter outliers.

A start line and an end line may be selected from the plurality of lines. The primary scanline may be used, at least in part, to select the start line and an end line. The start line may be characterized by being the first line in the plurality of lines after a quiet zone, as is described in relation to FIG. 5. Similarly, the end line may be determined to be the last line in the plurality of lines before a quiet zone. Thus, the lines between the start lines and the end line 614 may be determined to be included in the optical pattern.

In some embodiments, a common vanishing point may be determined from the plurality of lines. The common vanishing point may be used, at least in part, to identify the start line and the end line. The directions of the plurality of lines may be computed. A statistical model or other model may be applied to the plurality of lines and identify inliers and outliers, where the outliers have a direction significantly different than the direction of the inliers. The statistical model may include a vanishing point estimation. In some embodiments, the common vanishing point may be determined using the start line and the end line, and then used to determine a direction of the plurality of lines. In some embodiments, a vanishing point is not used. An edge direction may be determined and iteratively grown.

In some embodiments, a number of pixels of the barcode is counted before attempting to rectify a scanline or an image of the optical pattern. For example, a number of pixels of the barcode is calculated (e.g., counting a number of pixels in the area of interest), before estimating the start line and the end line. If the number of pixels of the barcode is above a predetermined threshold value (e.g., equal to or greater than one pixel per minimum element width), then the method proceeds to estimate the start line and the end line, based on the number of pixels of the barcode being above the predetermined threshold value.

At step 1012, corners of the optical pattern are localized. To localize the corners, the start line and the end line may be iteratively grown to localize the start corners and the end corners (e.g., as is shown in FIG. 6). Intensity values of pixels may be compared along a direction of the start line. The start line may thus be extended towards and away from the common vanishing point until another quiet zone is encountered. The other quiet zone may correspond to an edge of the optical pattern. The start corners may then be calculated. A similar process may be performed on the end line to calculate the end corners. Thus, the border dimensions of the optical pattern may be calculated, along with angles associated with image distortion. In some examples, the intensity value of the pixel may be compared to the surrounding pixels, without utilizing the predicted direction. The corners may also be localized by using a machine learning model.

At step 1016, a homography may be calculated using localized corners of the optical pattern and a specified shape (e.g., a rectangle). The homography may be associated with a rectified image of the optical pattern, such that distortion is corrected (e.g., pitch, yaw, or roll distortion). For example, the border dimensions and angles associated with image distortion may be used to map the optical pattern to an associated optical pattern of the specified shape, parallel to a plane of the camera (or "flat"). Thus, the width of the plurality of lines included in the optical pattern, and the spaces between each of the plurality of lines, may be normalized and properly decoded.

In some embodiments, a height and a width of the optical pattern may be determined using the localized corners. The height and width may then be used, along with a height and width of a target homography, to calculate the homography. The distance between the start and end edges and/or the corners may be used to compute the homography.

At step 1020, a scanline is rectified, generating a rectified scanline. In some embodiments, the entire image is not rectified, to reduce computation resources. The rectified scanline may be based on the homography between the localized corners and the specified shape. The rectified scanline may be similar to the primary scanline 306 in FIG. 3 or primary scanline 706 in FIG. 7, transformed by the same parameters used to calculate the homography. In some embodiments, a new scanline may be sampled from the result of the homography to generate the rectified scanline.

The rectified scanline may also include a plurality of points corresponding to a plurality of lines included in the homography of the optical pattern. The optical pattern is decoded along the rectified scanline. Using the rectified scanline (e.g., and/or using a start point, an end point, and a plurality of points between) the optical pattern may be decoded and data associated with the optical pattern accessed. The data may include information about a product or about the object on which the optical pattern is included. In some embodiments the scanline is rectified as an image is rectified, and not just the scanline, for decoding the optical pattern.

In some embodiments, a rectification step may or may not run, based on a threshold condition (e.g., when a ratio between the start and end lines is above or below a certain number). If the threshold is not met it is assumed that there is insignificant yaw and the original scanline is used (e.g., to reduce resampling errors). For example, scanline rectification can be run conditionally only if one or both the following statements are true:

1. The scanline length in pixels is above a minimum threshold of the estimated number of pixels per bar; and/or
2. The ratio between the length of a projection of a unit vector along the scanline close to the start edge of barcode relative to the length of a projection of a unit vector along the scanline close to the end edge of the barcode is far enough from 1.0 to warrant using scanline rectification. The threshold for this decision can be decided empirically.

In some embodiments, a rectification step may or may not run based on the results of corner localization (e.g., if corner localization fails, then the rectification process stops). Corner localization failure can be identified by:

1. The homography computed is invalid, has a reflection, and/or maps to a region outside the image; and/or
2. The corners are too far from the starting point.

In some embodiments, if the vanishing point estimation identifies that lines are parallel, the barcode is not affected by pitch distortion, the estimation of the edge direction is done using a more robust and faster algorithm that does not account for the local pitch distortion when computing the edge direction. The vanishing point estimation applies a statistical model to check whether a subset of lines are parallel. If that is the case, further processing uses an assumption of parallel lines to simplify (and speed up) the clustering of edge responses across the scanlines, filtering of outliers, and the selection of the optical patterns start and end edges since the algorithm does not need to account for local variation of the edge direction along the optical pattern's main axis (i.e., along the scanlines).

After the scanline (and/or the image) is rectified, the optical pattern is decoded (e.g., using the rectified scanline. In some embodiments, image enhancements are used after rectifying the scanline. For example, the scanline is sharpened and/or deblurred.

Figure 11:
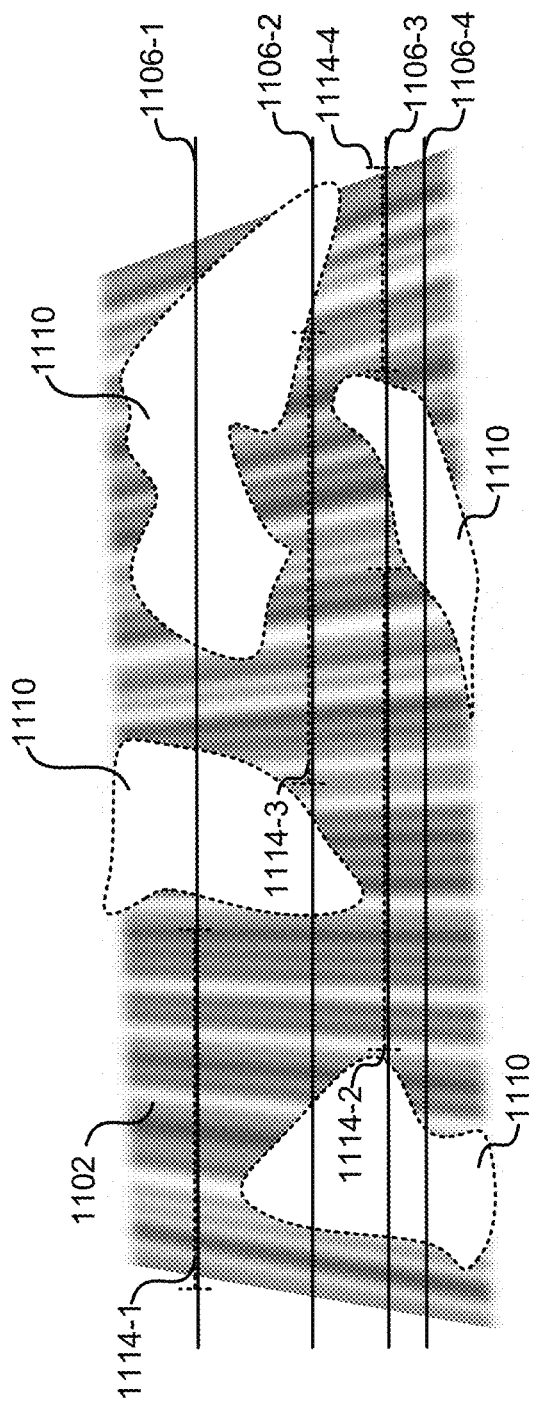
FIG. 11 depicts an embodiment of using multiple scanlines to decode an optical pattern.

FIG. 11 depicts an embodiment of using multiple scanlines to decode an optical pattern. FIG. 11 depicts optical pattern 1102. A first scanline 1106-1, a second scanline 1106-2, a third scanline 1106-3, and a fourth scanline 1106-4 are shown projected on an image of the optical pattern 1102.

The optical pattern 1102 is damaged, obscured, occluded, or otherwise unreadable in one or more portions 1110 of the image. For example, the optical pattern could be on a torn or missing portion of a label, an ink spot could be covering the portion 1110, or glare could occlude the portion 1110 of the image. In some embodiments, the portion 1110 is referred to as a damaged region, and an area outside portion 1110 is referred to as a usable region. The usable region(s) and the damaged region(s) are based on an image quality of one or more regions of the image. In some embodiments, damaged portions are identified by looking at an edge density or other features of an area. For example, edge density will be low for an area that is washed out by glare. If a primary scanline can be chosen that does not intersect or cross any damaged region, then that primary scanline is used. But if no scanline can be identified that does not cross a damaged region, then segments from multiple scanlines can be used.

Usable segments 1114 of scanlines 1106 are ascertained, based on the image quality of the one or more regions (e.g., to avoid portions 1110). A first segment 1114-1 from the first scanline 1106-1, a second segment 1114-2 from the third scanline 1106-3, a third segment 1114-3 from the second scanline 1106-2, and a fourth segment 1114-4 from the third scanline 1106-3 are identified. Though there are other usable segments (e.g., from the fourth scanline 1106-4 and/or other scanlines 1106), four segments (the first segment 1114-1, the second segment 1114-2, the third segment 1114-3, and the fourth segment 1114-4) are sufficient to decode the optical pattern 1102.

Segments 1114 from multiple scanlines 1106 are used because a quality of a single scanline 1106 is insufficient to decode the optical pattern 1102 accurately, or at all. In some embodiments, the segments 1114, or the image of the optical pattern 1102, are rectified (e.g., as described above). In some embodiments, the image is not rectified (e.g., before using segments from multiple scanlines to decode an optical pattern). For example, an image of the optical pattern is acquired while the camera sensor is in a plane parallel to a plane of the optical pattern.

The segments 1114 can be spliced to generate a spliced segment. The spliced segment (or each individual segment 1114) is decoded (e.g., to obtain payload data). By using segments 1114 of scanlines 1106, otherwise unreadable optical patterns can be read. In some embodiments, scanlines of the same data region can be combined (e.g., averaged together) to create a scanline slice of higher quality from lower quality sections. For example, portions of the fourth scanline 1106-4 could be averaged with portions (e.g., segments 1114) of the first scanline 1114-1, portions of the second scanline 1106-2, and/or portions of the third scanline 1106-3. In another example, overlapping portions of the first scanline 1106-1, the second scanline 1106-2, and/or the third scanline 1106-3 can be combined (e.g., averaged).

Figure 12:
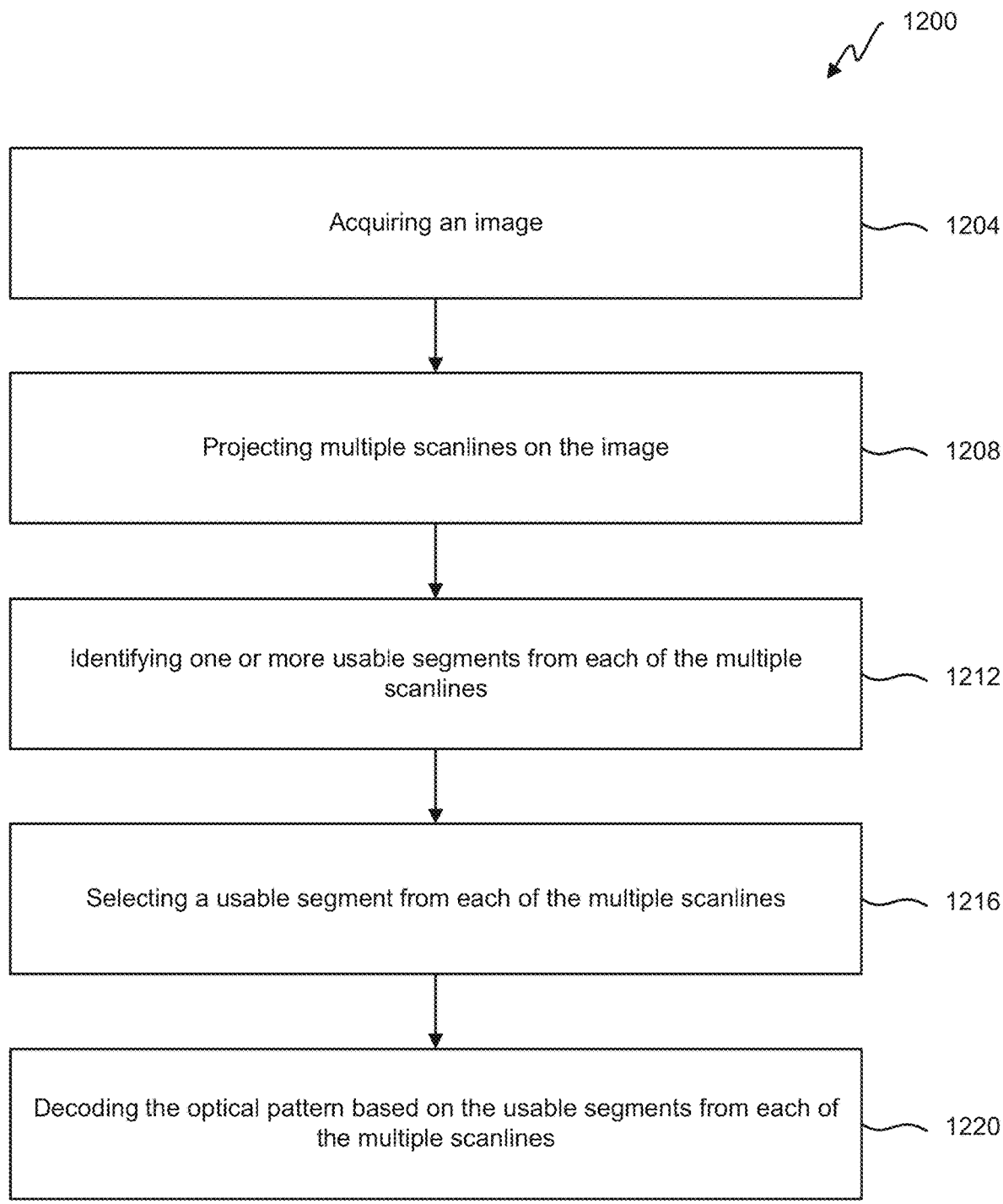
FIG. 12 depicts a flowchart of an embodiment of a process for using multiple scanlines to decode an optical pattern.

FIG. 12 depicts a flowchart of an embodiment of a process 1200 for using multiple scanlines to decode an optical pattern. Process 1200 begins in step 1204 with acquiring an image. For example, the image of the optical pattern 1102 in FIG. 11 is acquired. The image comprises an optical pattern (e.g., optical pattern 1102 in FIG. 11).

In step 1208, multiple scanlines are projected on the image. In some embodiments, a scanline is a straight line, oriented orthogonal to bars of a barcode, and/or oriented in a direction of text. In some embodiments, scanlines are parallel to each other. For example, the first scanline 1106-1, the second scanline 1106-2, and the third scanline 1106-3 are projected on the optical pattern 1102 in FIG. 11. In some embodiments, the scanlines are mathematically projected onto the image.

In step 1212, useable segments are identified from each of the multiple scanlines. In step 1216, usable segments of scanlines are selected from each of the multiple scanlines. Segments are selected to traverse the optical pattern. For example, segments 1114 in FIG. 11 are identified and selected from scanlines 1106-1, 1106-2, and 1106-3.

The optical pattern is decoded based on selected segments from multiple scanlines. For example, segments 1114 are decoded individually and/or as a spliced segment. In some embodiments, segments from 2, 3, 4, 5, 10, or more scanlines are used. In some embodiments, a number of scanlines used does not exceed 30, 15, 10, 5, 3, or 2. In some embodiments, more than one, non-contiguous, segment from one scanline is used. For example, two segments, the second segment 1114-2 and the fourth segment 1114-4, of the third scanline 1106-3 in FIG. 11 are used to decode the optical pattern 1102. In some embodiments, the method comprises detecting the optical pattern, ascertaining an orientation of the optical pattern, and/or projecting scanlines based on the orientation of the optical pattern. In some embodiments, scanlines are truncated on the image so that the scanlines do not exceed more than 105%, 110%, 120%, or 150% of a width of the optical pattern.

Figure 13:
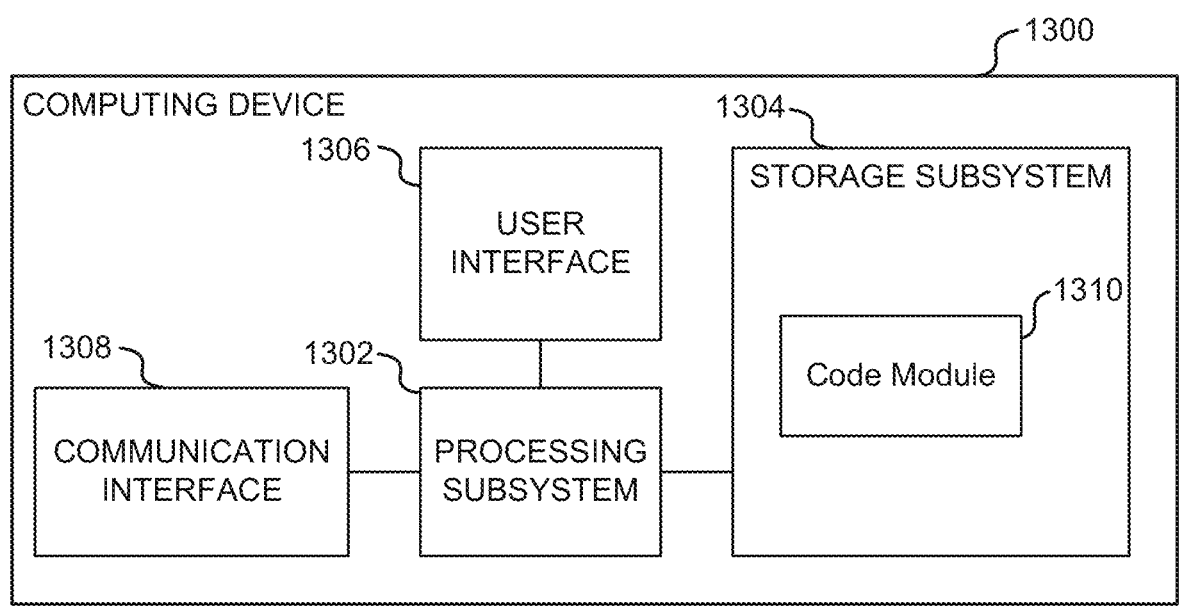
FIG. 13 depicts a block diagram of an embodiment of a computer system.

FIG. 13 is a simplified block diagram of a computing device 1300. Computing device 1300 can implement some or all functions, behaviors, and/or capabilities described above that would use electronic storage or processing, as well as other functions, behaviors, or capabilities not expressly described. Computing device 1300 includes a processing subsystem 1302, a storage subsystem 1304, a user interface 1306, and/or a communication interface 1308. Computing device 1300 can also include other components (not explicitly shown) such as a battery, power controllers, and other components operable to provide various enhanced capabilities. In various embodiments, computing device 1300 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1304 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1304 can store one or more applications and/or operating system programs to be executed by processing subsystem 1302, including programs to implement some or all operations described above that would be performed using a computer. For example, storage subsystem 1304 can store one or more code modules 1310 for implementing one or more method steps described above.

A firmware and/or software implementation may be implemented with modules (e.g., procedures, functions, and so on). A machine-readable medium tangibly embodying instructions may be used in implementing methodologies described herein. Code modules 1310 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1310) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1310 may comprise sets of instructions (codes) embodied on a computer-readable medium that directs a processor of a computing device 1300 to perform corresponding actions. The instructions may be configured to run in sequential order, in parallel (such as under different processing threads), or in a combination thereof. After loading a code module 1310 on a general purpose computer system, the general purpose computer is transformed into a special purpose computer system.

Computer programs incorporating various features described herein (e.g., in one or more code modules 1310) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 1304 can also store information useful for establishing network connections using the communication interface 1308.

User interface 1306 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1306 to invoke the functionality of computing device 1300 and can view and/or hear output from computing device 1300 via output devices of user interface 1306. For some embodiments, the user interface 1306 might not be present (e.g., for a process using an ASIC).

Processing subsystem 1302 can be implemented as one or more processors (e.g., integrated circuits, one or more single-core or multi-core microprocessors, microcontrollers, central processing unit, graphics processing unit, etc.). In operation, processing subsystem 1302 can control the operation of computing device 1300. In some embodiments, processing subsystem 1302 can execute a variety of programs in response to program code and can maintain multiple concurrently executing programs or processes. At a given time, some or all of a program code to be executed can reside in processing subsystem 1302 and/or in storage media, such as storage subsystem 1304. Through programming, processing subsystem 1302 can provide various functionality for computing device 1300. Processing subsystem 1302 can also execute other programs to control other functions of computing device 1300, including programs that may be stored in storage subsystem 1304.

Communication interface 1308 can provide voice and/or data communication capability for computing device 1300. In some embodiments, communication interface 1308 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1308 can provide wired connectivity (e.g., universal serial bus, Ethernet, universal asynchronous receiver/transmitter, etc.) in addition to, or in lieu of, a wireless interface. Communication interface 1308 can be implemented using a combination of hardware (e.g., driver circuits, antennas, modulators/demodulators, encoders/decoders, and other analog and/or digital signal processing circuits) and software components. In some embodiments, communication interface 1308 can support multiple communication channels concurrently. In some embodiments the communication interface 1308 is not used.

It will be appreciated that computing device 1300 is illustrative and that variations and modifications are possible. A computing device can have various functionality not specifically described (e.g., voice communication via cellular telephone networks) and can include components appropriate to such functionality.

Further, while the computing device 1300 is described with reference to particular blocks, it is to be understood that these blocks are defined for convenience of description and are not intended to imply a particular physical arrangement of component parts. For example, the processing subsystem 1302, the storage subsystem, the user interface 1306, and/or the communication interface 1308 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 1300.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for decoding an optical pattern, the system comprising:
    a camera; and
    one or more processors configured to:
        receive an initial area of interest of an image predicted to contain the optical pattern;
        estimate a start line and an end line of the optical pattern, wherein estimating the start line and the end line comprises:
            generating a plurality of scanlines across the optical pattern, within the initial area of interest, wherein the plurality of scanlines comprise data associated with the optical pattern;
            computing edge responses of the optical pattern using the plurality of scanlines;
            clustering the edge responses into a plurality of lines; and
            selecting a first line of the plurality of lines as the start line and a second line of the plurality of lines as the end line;
        localize corners of the optical pattern;
        calculate a homography between localized corners of the optical pattern and a specified shape;
        rectify a scanline to generate a rectified scanline, based on the homography between the localized corners of the optical pattern and the specified shape; and
        decode the optical pattern along the rectified scanline.

2. The system of claim 1, wherein clustering the edge responses into the plurality of lines further comprises computing directions of the plurality of lines and identifying inliers and outliners.

3. The system of claim 1, wherein the scanline rectified to generate the rectified scanline is a scanline generated after calculating the homography between localized corners of the optical pattern and the specified shape.

4. The system of claim 1, wherein the initial area of interest is a user defined area, identified by a machine-learning model, or identified by a computer-vision model.

5. The system of claim 1, wherein localizing the corners of the start line comprises iteratively growing the start line by comparing intensity values of pixels along a direction of the start line.

6. A method for decoding an optical pattern, the method comprising:
    receiving an initial area of interest of an image predicted to contain the optical pattern;
    estimating a start line and an end line of the optical pattern, wherein estimating the start line and the end line comprises:
        generating a plurality of scanlines across the optical pattern, wherein the plurality of scanlines comprise data associated with the optical pattern;
        computing edge responses of the optical pattern using the plurality of scanlines;
        clustering the edge responses into a plurality of lines; and
        selecting a first line of the plurality of lines as the start line and a second line of the plurality of lines as the end line;
    localizing corners of the optical pattern;
    calculating a homography between localized corners of the optical pattern and a specified shape;
    rectifying a scanline to generate a rectified scanline, based on the homography between the localized corners of the optical pattern and the specified shape; and
    decoding the optical pattern along the rectified scanline.

7. The method of claim 6, wherein localizing corners of the optical pattern comprises iteratively growing the start line and iteratively growing the end line.

8. The method of claim 7, wherein iteratively growing the start line comprises comparing intensity values of pixels along a direction of the start line.

9. The method of claim 6, further comprising estimating an area of the optical pattern based on localizing corners of the optical pattern and using a height and a width of a target homography.

10. The method of claim 6, wherein the optical pattern is a barcode and the method further comprises:
    calculating a number of pixels of the barcode, before estimating the start line and the end line; and
    proceeding to estimate the start line and the end line based on the number of pixels of the barcode being above a predetermined threshold value.

11. The method of claim 6, wherein the optical pattern is a one-dimensional barcode.

12. The method of claim 6, wherein the rectified scanline is one of the plurality of scanlines.

13. The method of claim 6, wherein the rectified scanline is a scanline generated after calculating the homography between localized corners of the optical pattern and the specified shape.

14. The method of claim 6, wherein the initial area of interest is a user defined area, identified by a machine-learning model, and/or identified by a computer-vision model.

15. The method of claim 6, wherein computing edge responses of the plurality of scanlines comprises:
    detecting a difference in pixel intensity between pixels of the image to define the edge responses; and applying a statistical model to the edge responses to cluster the edge responses into the plurality of lines, wherein the statistical model computes directions of the plurality of lines and identifies inliers and outliners.

16. The method of claim 6, further comprising:

projecting multiple scanlines on the image;

ascertaining one or more useable segments of the multiple scanlines, based on an image quality of one or more regions of the image, wherein a quality of a single scanline is insufficient to decode the optical pattern; and selecting usable segments from each of the multiple scanlines to decode the optical pattern.

17. The method of claim 6 wherein the plurality of scanlines are generated to not overlap each other.

18. A memory device comprising instructions that, when executed, cause one or more processors to perform the following steps for decoding an optical pattern:

receiving an initial area of interest of an image predicted to contain the optical pattern;

estimating a start line and an end line of the optical pattern, wherein estimating the start line and the end line comprises:

generating a plurality of scanlines across the optical pattern, wherein the plurality of scanlines comprise data associated with the optical pattern;

computing edge responses of the optical pattern using the plurality of scanlines;

clustering the edge responses into a plurality of lines;

selecting a first line of the plurality of lines as the start line and a second line of the plurality of lines as the end line;

localizing corners of the optical pattern;

calculating a homography between localized corners of the optical pattern and a specified shape;

rectifying a scanline to generate a rectified scanline, based on the homography between the localized corners of the optical pattern and the specified shape; and decoding the optical pattern along the rectified scanline.

19. The memory device of claim 18 wherein the instructions, when executed, cause the one or more processors to perform the following steps:

projecting multiple scanlines on the image;

ascertaining one or more useable segments of the multiple scanlines, based on an image quality of one or more regions of the image, wherein a quality of a single scanline is insufficient to decode the optical pattern; and selecting usable portions from each of the multiple scanlines to decode the optical pattern.

20. The memory device of claim 18 wherein the instructions to compute the edge responses of the plurality of scanlines further comprises:

detecting a difference in pixel intensity between pixels of the image to define the edge responses; and applying a statistical model to the edge responses to cluster the edge responses into the plurality of lines.

* * * * *